(12) United States Patent
Dickens et al.

(10) Patent No.: US 11,165,599 B2
(45) Date of Patent: Nov. 2, 2021

(54) COGNITIVE COMPONENT SELECTION AND IMPLEMENTATION

(71) Applicant: International Business Machines Corporation, Armonk, NY (US)

(72) Inventors: Louie A. Dickens, Tucson, AZ (US); Rodolfo Lopez, Austin, TX (US); Mara Miranda Bautista, Guadalajara (MX)

(73) Assignee: International Business Machines Corporation, Armonk, NY (US)

(*) Notice: Subject to any disclaimer, the term of this patent is extended or adjusted under 35 U.S.C. 154(b) by 179 days.

(21) Appl. No.: 16/140,344

(22) Filed: Sep. 24, 2018

(65) Prior Publication Data

US 2020/0099544 A1 Mar. 26, 2020

(51) Int. Cl.
*H04L 12/28* (2006.01)
*G05B 15/02* (2006.01)
*H04W 4/80* (2018.01)
*H04W 64/00* (2009.01)

(52) U.S. Cl.
CPC ......... *H04L 12/2807* (2013.01); *G05B 15/02* (2013.01); *H04L 12/2816* (2013.01); *H04L 12/2838* (2013.01); *H04W 4/80* (2018.02); *H04W 64/003* (2013.01); *G05B 2219/2642* (2013.01)

(58) Field of Classification Search
CPC ............. H04L 12/2807; H04L 12/2816; H04L 12/2838; H04L 12/2809; G05B 15/02; G05B 2219/2642; H04W 4/80; H04W 64/003; G08C 2201/93; G08C 17/02; G08C 2201/91

See application file for complete search history.

(56) References Cited

U.S. PATENT DOCUMENTS

| | | |
|---|---|---|
| 8,533,144 B1 | 9/2013 | Reeser et al. |
| 9,252,967 B2 | 2/2016 | Li et al. |
| 9,614,690 B2 | 4/2017 | Ehsani et al. |
| 9,806,900 B2 | 10/2017 | Jacobson et al. |
| 9,900,177 B2 | 2/2018 | Holley |
| 9,947,312 B1 | 4/2018 | Hieb |
| 2013/0138757 A1 | 5/2013 | Ferron |
| 2015/0341184 A1 | 11/2015 | Tatzel et al. |
| 2016/0209822 A1 | 7/2016 | Pulliam et al. |
| 2018/0013576 A1 | 1/2018 | Sadhu |
| 2018/0032048 A1 | 2/2018 | Devis et al. |
| 2018/0120793 A1* | 5/2018 | Tiwari .................. G06Q 10/06 |

(Continued)

OTHER PUBLICATIONS

Elshafee et al., "Design and Implementation of a WiFi Based Home Automation System," World Academy of Science, Engineering and Technology, International Journal of Computer and Information Engineering, vol. 6, No. 8, 2012, pp. 1074-1080.

(Continued)

*Primary Examiner* — Kim T Nguyen
(74) *Attorney, Agent, or Firm* — Zilka-Kotab, P.C.

(57) ABSTRACT

A computer-implemented method according to one embodiment includes identifying locations of a plurality of components to be implemented within a site, identifying characteristics of the site, and determining details for each of the plurality of components to be implemented within the site, utilizing the location of the plurality of components and the characteristics of the site.

20 Claims, 9 Drawing Sheets

(56) References Cited

U.S. PATENT DOCUMENTS

| | | |
|---|---|---|
| 2018/0139068 A1 | 5/2018 | Mercelat et al. |
| 2019/0206130 A1* | 7/2019 | Ericson .................. G06K 9/18 |

OTHER PUBLICATIONS

Kao et al., "User-configurable semantic home automation," Computer Standards & Interfaces, vol. 34, 2012, pp. 171-188.

Sanchez et al., "A framework for developing home automation systems: From requirements to code," The Journal of Systems and Software, 2011, 14 pages.

Lee et al., "Smart Power-Strip: Home Automation by Bringing Outlets into the IoT," IEEE, 2017, pp. 127-130.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Dec. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

Calaos, "Open Source Home Automation," Calaos, 2018, 8 pages, retrieved from https://calaos.fr/en/.

Domoticz, "Control at your finger tips," Domoticz, 2017, 2 pages, retrieved from https://domoticz.com/.

Home Assistant, "Awaken your home," Home Assistant, 2018, 6 pages, retrieved from https://www.home-assistant.io/.

Misterhouse, "It Knows Kung-Fu," MisterHouse, 2017, 1 page, retrieved from http://misterhouse.sourceforge.net/.

OpenHAB, "empowering the smart home," openHAB, 2018, 10 pages, retrieved from https://www.openhab.org/.

Home Depot, "Ryobi, Phone Works Laser Distance Measurer," Home Depot, 2018, 5 pages, retrieved from https://www.homedepot.com/p/Ryobi-Phone-Works-Laser-Distance-Measurer-ES1000/205495687.

Smart Homes International, "Why go smart?" smarthomesinternational.com, 2018, 1 page, retrieved from https://smarthomesinternational.com/why-go-smart/#wizard1-h-1.

Fieldwire, "The blueprint app for the jobsite," Fieldwire, 2018, 6 pages, retrieved from https://www.fieldwire.com/blueprint-app/.

Johansson, A., "Smart home automation: A look at the top 4 barriers to growth," Smart Cities Dive, Apr. 17, 2017, 3 pages, retrieved from https://www.smartcitiesdive.com/news/smart-home-automation-a-look-at-the-top-4-barriers-to-growth/440582/.

Wikipedia, "Home automation," Wikipedia, 2019, 6 pages, retrieved from https://en.wikipedia.org/wiki/Home_automation.

* cited by examiner

COGNITIVE COMPONENT SELECTION AND IMPLEMENTATION

BACKGROUND

The present invention relates to communications networks, and more specifically, this invention relates to dynamically selecting, configurating, and implementing components within one or more communications networks.

Electronic components such as network devices, home automation devices, and "smart" devices are commonly used within homes, offices, and other sites. However, devices are often incorrectly installed/implemented within a site, which may cause performance issues with the devices and other components communicating with those devices. Incorrect devices, or devices with inferior performance when compared to other devices, may also be installed within a site, which may also cause performance issues, security issues, etc.

SUMMARY

A computer-implemented method according to one embodiment includes identifying locations of a plurality of components to be implemented within a site, identifying characteristics of the site, and determining details for each of the plurality of components to be implemented within the site, utilizing the location of the plurality of components and the characteristics of the site.

According to another embodiment, a computer program product for performing cognitive component selection includes a computer readable storage medium that has program instructions embodied therewith, where the computer readable storage medium is not a transitory signal per se, and where the program instructions are executable by a processor to cause the processor to perform a method comprising identifying, by the processor, locations of a plurality of components to be implemented within a site, identifying, by the processor, characteristics of the site, and determining, by the processor, details for each of the plurality of components to be implemented within the site, utilizing the location of the plurality of components and the characteristics of the site.

A computer-implemented method according to another embodiment includes identifying a plurality of components to be implemented within a site, determining details of each of the plurality of components, and configuring and implementing the plurality of components within the site, utilizing the details of each of the plurality of components.

Other aspects and embodiments of the present invention will become apparent from the following detailed description, which, when taken in conjunction with the drawings, illustrate by way of example the principles of the invention.

DETAILED DESCRIPTION

Figure 1:
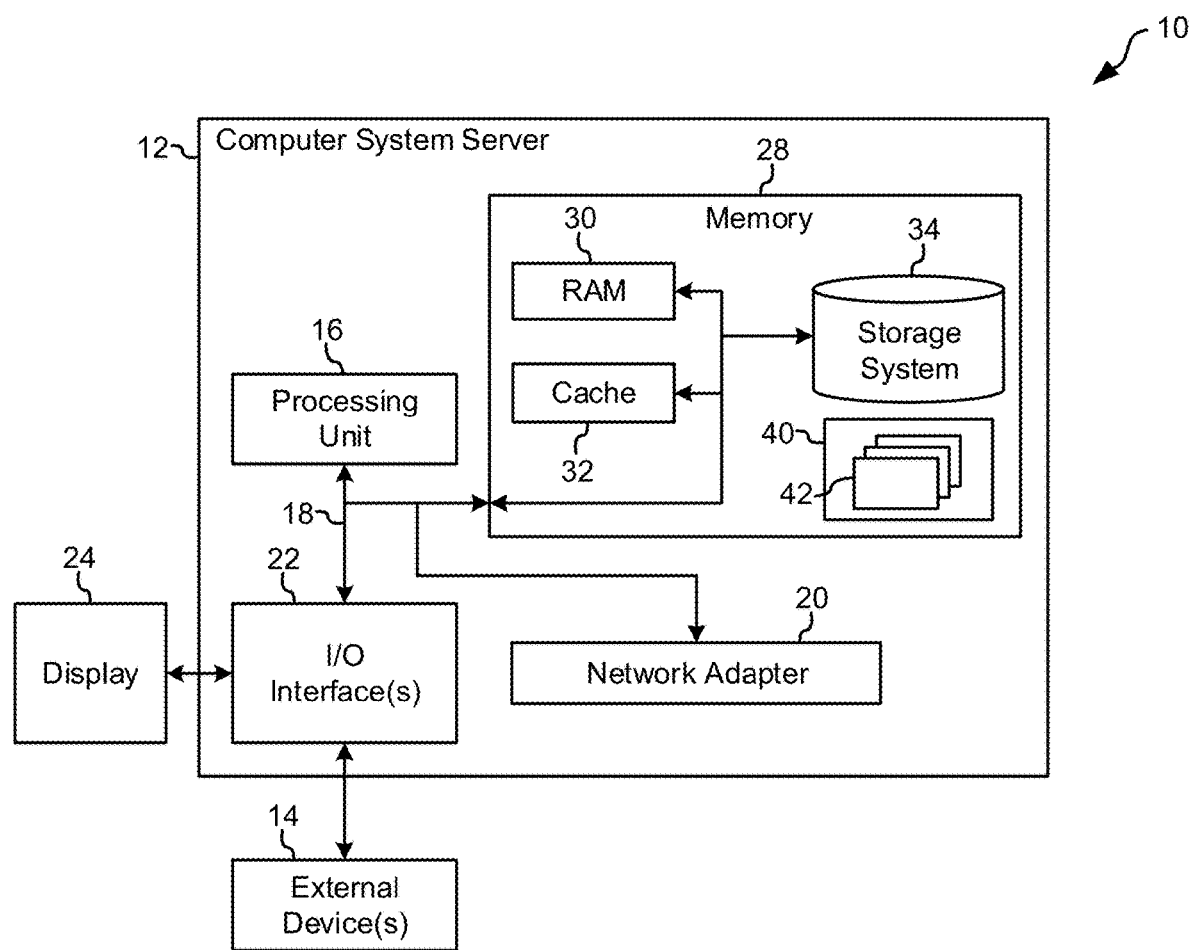
FIG. 1 depicts a cloud computing node according to an embodiment of the present invention.

The following description discloses several preferred embodiments of systems, methods and computer program products for performing cognitive component selection and implementation. Various embodiments provide a method for dynamically determining and implementing components within a site, based on an analysis of a plurality of site and user factors.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing cognitive component selection and implementation.

In one general embodiment, a computer-implemented method includes identifying locations of a plurality of components to be implemented within a site, identifying characteristics of the site, and determining details for each of the plurality of components to be implemented within the site, utilizing the location of the plurality of components and the characteristics of the site.

In another general embodiment, a computer program product for performing cognitive component selection includes a computer readable storage medium that has program instructions embodied therewith, where the computer readable storage medium is not a transitory signal per se, and where the program instructions are executable by a processor to cause the processor to perform a method comprising identifying, by the processor, locations of a plurality of components to be implemented within a site, identifying, by the processor, characteristics of the site, and determining, by the processor, details for each of the plurality of components to be implemented within the site, utilizing the location of the plurality of components and the characteristics of the site.

In another general embodiment, a computer-implemented method includes identifying a plurality of components to be implemented within a site, determining details of each of the plurality of components, and configuring and implementing the plurality of components within the site, utilizing the details of each of the plurality of components.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
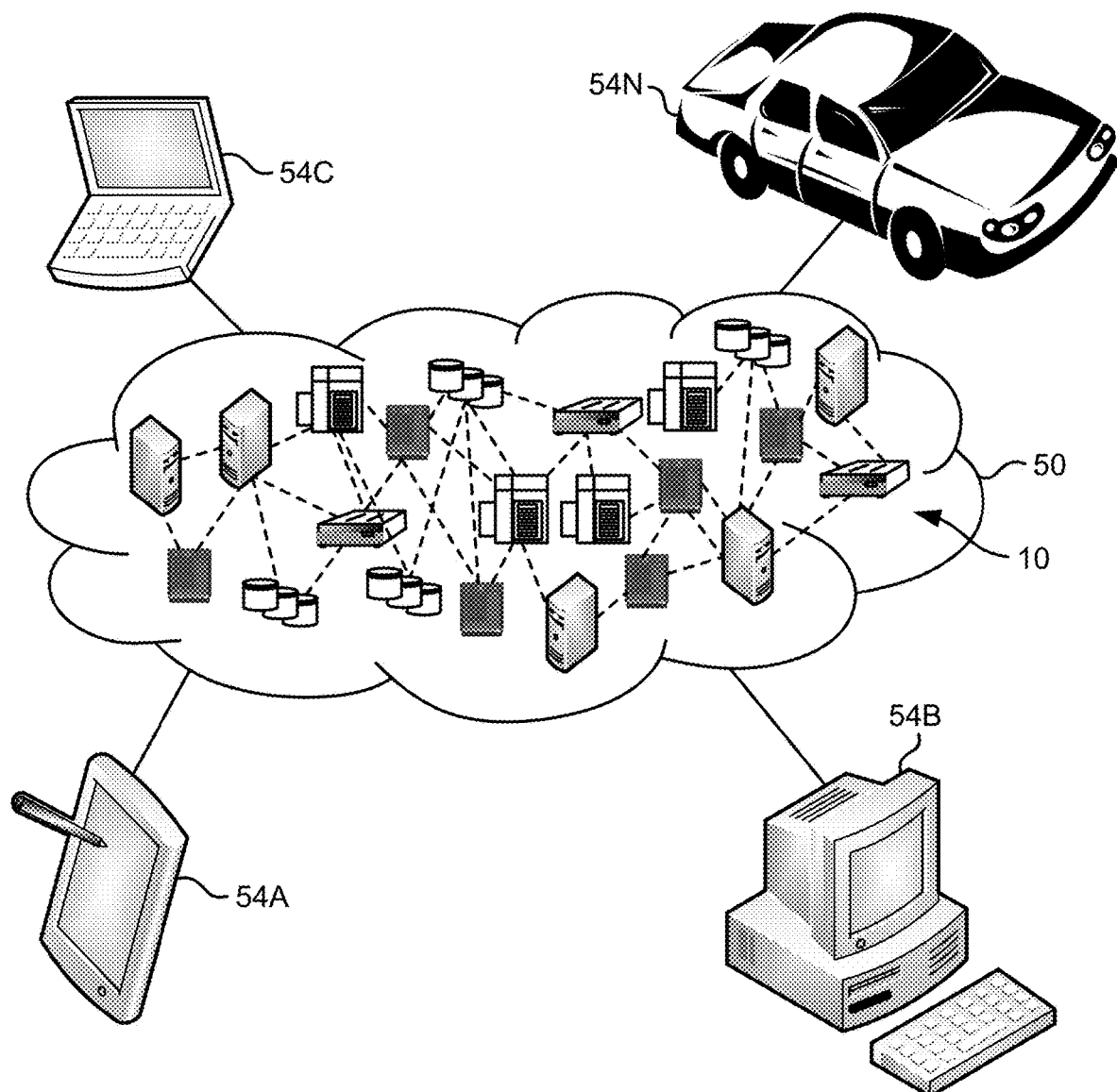
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
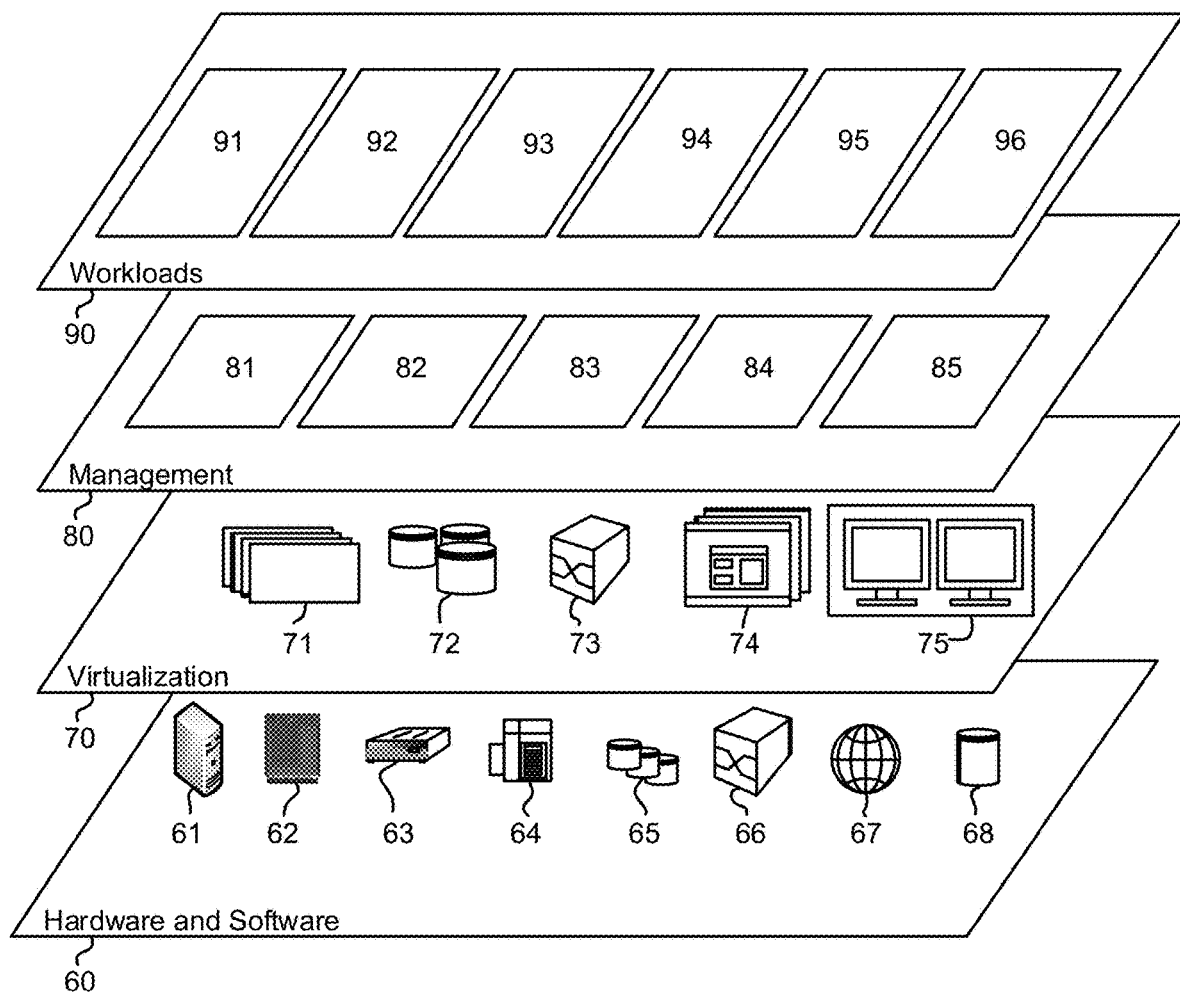
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive component selection and implementation 96.

Figure 4:
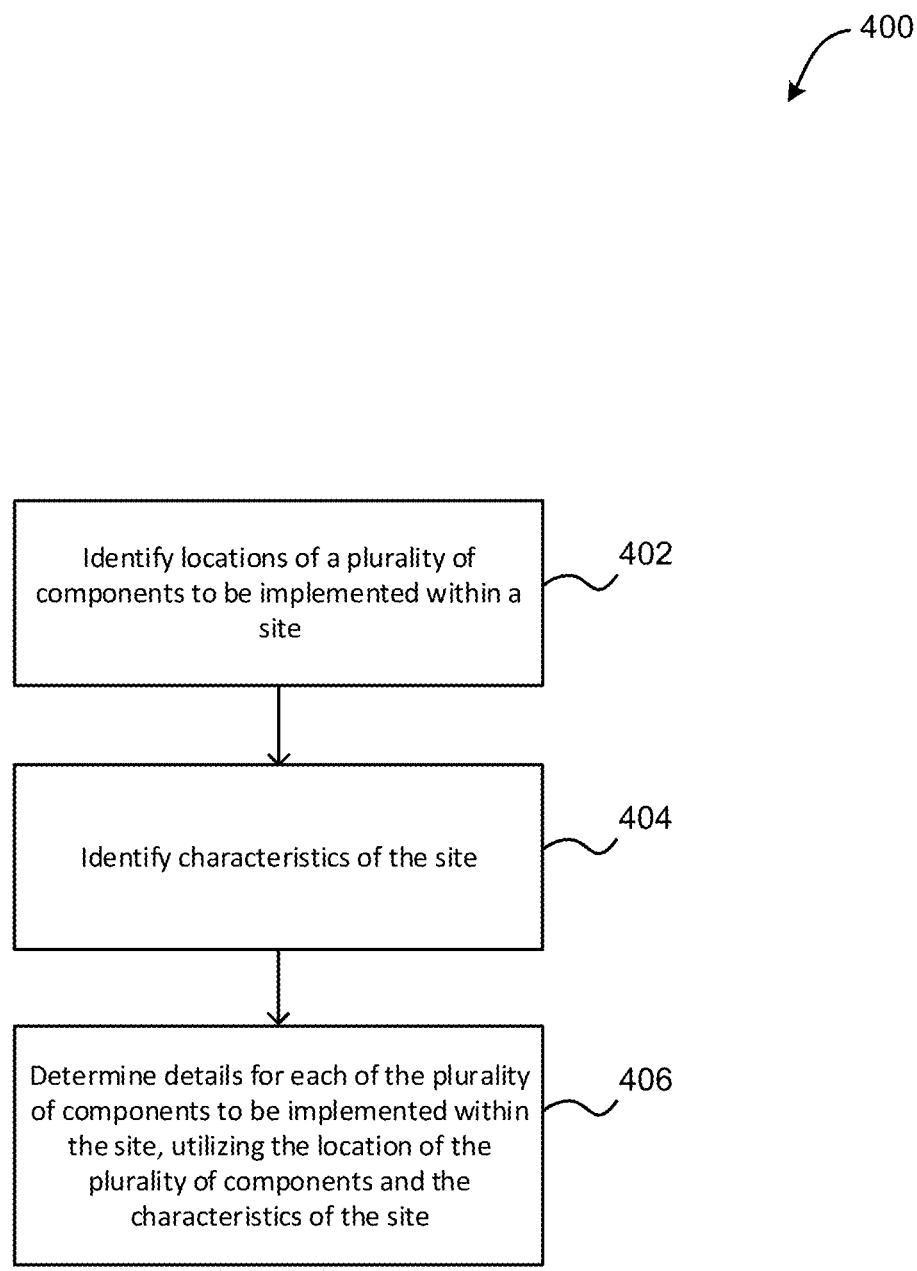
FIG. 4 illustrates a flowchart of a method for performing cognitive component selection, in accordance with one embodiment.

Now referring to FIG. 4, a flowchart of a method 400 for performing cognitive component selection is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where locations of a plurality of components to be implemented within a site are identified. In one embodiment, the plurality of components to be implemented within the site may not be currently implemented within the site. In another embodiment, the plurality of components may include a plurality of network devices desired to be implemented within the site. For example, the plurality of components may include one or more network routers, switches, modems, repeaters, expanders, etc.

Additionally, in one embodiment, the plurality of components may include a plurality of home automation devices desired to be implemented within the site. For example, the plurality of components may include one or more networked smart lights, smart power switches, cameras, etc. In another embodiment, the plurality of components may include a plurality of IoT-connected devices desired to be implemented within the site. For example, the plurality of components may include a networked television, thermostat, smoke detector, etc.

Further, in one embodiment, the site may include one or more buildings, one or more rooms within a building (e.g., rooms within a home), etc. In another embodiment, the plurality of components may be represented by a plurality of tags. In yet another embodiment, the locations of the plurality of components may be identified utilizing a plurality of RFID tags.

For example, each of a plurality of RFID tags may correspond to a predetermined component to be implemented within the site. In another example, each of the plurality of tags may be placed at a predetermined location within the site (e.g., utilizing an adhesive backing, etc.). In yet another example, an RFID reader may be used to determine a location of each of the plurality of RFID tags within the site. In still another embodiment, the RFID reader may include a directional RFID reader that determines a specific location of each of the plurality of RFID tags with respect to the RFID reader.

Further still, in one embodiment, the locations of the plurality of components may be identified utilizing image and/or video analysis of a plurality of visual tags. For example, a camera of a device may be used to take one or more pictures of the site. In another example, within each picture, image analysis may be used to identify one or more visual tags placed within the site (e.g., using an adhesive backing, etc.). In yet another example, each visual tag may include a code (e.g., a matrix barcode, etc.), a textual description of a component associated with the visual tag, etc.

Also, in one example, the code or textual description may be analyzed to determine the component associated with the visual tag. In another example, the location of each visual tag within the site may be determined based on an analysis of the one or more pictures/video.

In addition, in one embodiment, the locations of the plurality of components may be manually added by a user. For example, the user may manually input a textual description of the locations of each of the plurality of components. In another example, the textual description may be parsed in order to determine the locations. In yet another example, the user may manually place markers within an illustrated representation of the site, utilizing a graphical user interface (GUI).

Furthermore, method 400 may proceed with operation 404, where characteristics of the site are identified. In one embodiment, the characteristics of the site may include physical dimensions of the site. For example, the characteristics may include dimensions of one or more rooms within the site. In another embodiment, a measurement tool may be used to determine the physical dimensions of the site.

For example, the measurement tool may include a laser distance measure. In another example, the measurement tool may include a camera. For instance, the camera may identify one or more walls within the site, and may use one or more landmarks (e.g., windows, etc.) and/or GPS data to approximate dimensions of the site.

Further still, in one embodiment, the characteristics of the site may include one or more objects located within the site. For example, image analysis of a picture of a wall within the site may determine whether the wall is a signal blocking wall (e.g., a cinder block wall, etc.). In another example, image analysis of the site may determine whether the site contains furniture, electronics, or other items that constitute an interference factor (e.g., a fish tank, a microwave oven, etc.).

Also, in one embodiment, the characteristics of the site may include one or more devices that are currently implemented within the site. For example, the characteristics of the site may include a wireless router currently installed within the site, one or more power outlets currently installed within the site, etc. In another example, one or more devices that are currently implemented within the site may be identified using image and/or video analysis/recognition. For instance, one or more images may be captured of the devices within the site. Additionally, image analysis may be used to determine a make/model of each of the devices (e.g., utilizing image comparison, textual analysis of writing on a device, etc.).

Further, in one embodiment, the characteristics of the site may include details of each of the devices that are currently implemented within the site. For example, identified devices may be cross referenced with one or more databases (e.g., user manual databases, etc.) in order to determine the functionality and/or features of each identified device. In another embodiment, one or more of the characteristics of the site may be manually input by a user (e.g., utilizing a GUI, etc.).

Further still, in one embodiment, the locations of the plurality of components to be implemented within the site, as well as the characteristics of the site, may be identified utilizing one or more hardware components (e.g., a mobile device equipped with one or more cameras, one or more RFID readers, etc.). In another embodiment, the locations of the plurality of components to be implemented within the site, as well as the characteristics of the site, may be identified within a cloud computing environment.

Also, method 400 may proceed with operation 406, where details for each of the plurality of components to be implemented within the site are determined, utilizing the location of the plurality of components and the characteristics of the site. In one embodiment, the details for each of the plurality of components to be implemented within the site may include required characteristics of each of the plurality of components.

For example, the require characteristics may include one or more of a required wireless communications protocol, a required security protocol, a required communications range, a required amount of data storage, etc. In another example, the required characteristics for a component may be determined based on a location of the component within the system with respect to other components. For instance, a first component that is required to communicate with a second component within the site, and is located a predetermined distance from the second component, may be assigned a required characteristic indicating a required communication signal distance matching the predetermined distance.

In addition, in one embodiment, the details may include one or more interference factors that are determined for the site, utilizing the identified characteristics of the site. For example, the one or more interference factors may include one or more aspects of the site that produce wireless signal interference, impede a wireless signal, etc. In another example, the one or more interference factors may include one or more cinder block walls that are determined to interfere with wireless signals, one or more fish tanks that are determined to interfere with wireless signals, etc.

Furthermore, in one embodiment, a list of predetermined interference factors may include characteristics of each of the interference factors. For example, the characteristics of the site and the details for each of the plurality of components to be implemented within the site may be compared against the characteristics of each of the interference factors, and one or more interference factors may be determined, based on the comparison.

Further still, in one embodiment, the details for each of the plurality of components to be implemented within the site may include a placement of each of the plurality of components within the site. For example, if a current location of a component to be implemented within the site (or a component currently implemented within the site) creates one or more interference factors, a new location of the component may be provided that overcomes the interference factors. In another example, if a location of a wireless router to be implemented within a room of a house is behind a fish tank, which would cause interference problems, a new location may be suggested for the wireless router that is near an available power outlet and away from the fish tank, which would alleviate the communications problems.

Also, in one embodiment, additional components to be implemented within the site may be determined, based on the location of the plurality of components and the characteristics of the site. For example, if a location of a wireless router to be implemented within a room of a house is greater than a predetermined distance (e.g., a maximum communications threshold distance, etc.) from another wireless component that requires the wireless router to communicate with a network, a range extender may be identified that would enable consistent communications between the wireless router and the other wireless component.

Additionally, in one embodiment, a virtual blueprint may be constructed for the site, based on the details for each of the plurality of components to be implemented within the site and the characteristics of the site. For example, the virtual blueprint may include a layout of the site, including dimensions of the site. In another example, a placement of each of the plurality of components within the site may be indicated within the blueprint. In yet another example, the virtual blueprint may indicate a communications range of one or more of the plurality of components within the site. In still another example, the virtual blueprint may indicate any interference factors within the site.

Further, in one embodiment, the details for each of the plurality of components to be implemented within the site may be compared to a list of currently available components in order to determine a build list. For example, characteristics of commercially available components may be compared to the details for each of the plurality of components in order to determine commercially available components necessary for effective implementation within the site.

Further still, in one embodiment, within a current inventory of one or more retailers may be compared to the necessary commercially available components, and may be automatically purchased if available for sale (e.g., below a predetermined budget/price threshold, etc.). In another embodiment, the commercially available components necessary for effective implementation within the site may be presented to the user. In yet another embodiment, the details may be determined utilizing one or more hardware components (e.g., a mobile device, etc.) and/or within a cloud computing environment.

In this way, component characteristics and placement may be dynamically optimized for a site, given characteristics of the site and the components. This may improve a performance of all components within the site by reducing network congestion and/or interference between components, improving network reception between components, eliminating component communications performance bottlenecks, synchronizing communication protocols between components, ensuring that optimal components are being used, etc.

Figure 5:
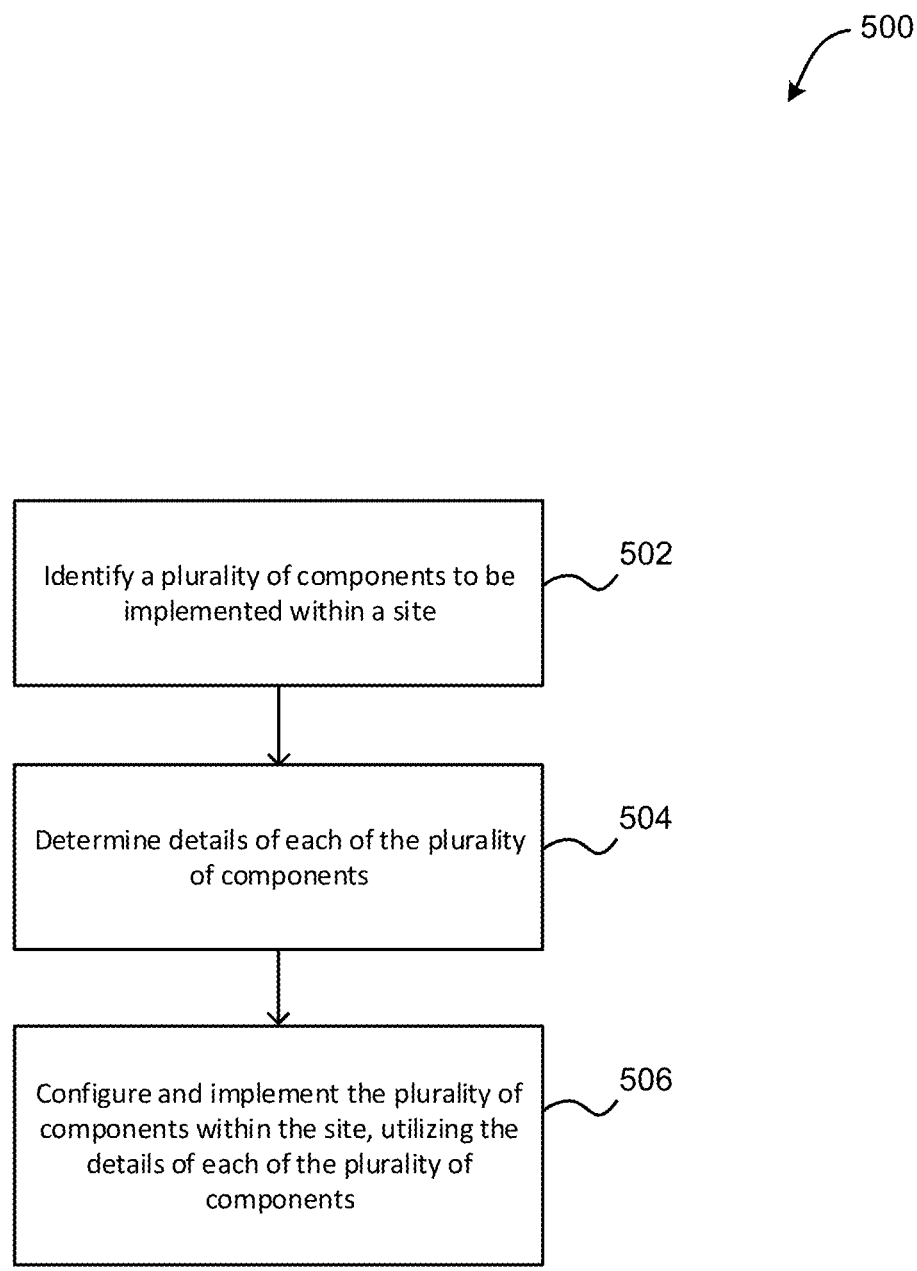
FIG. 5 illustrates a flowchart of a method for performing cognitive component implementation, in accordance with one embodiment.

Now referring to FIG. 5, a flowchart of a method 500 for performing cognitive component implementation is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a plurality of components to be implemented within a site are identified. In one embodiment, the plurality of components may include components having details determined utilizing the location of the plurality of components and the characteristics of the site. In another embodiment, the plurality of components may include a plurality of network devices, a plurality of home automation devices, a plurality of IoT-connected devices, etc. In yet another embodiment, the site may include one or more buildings, one or more rooms within a building (e.g., rooms within a home), etc.

Additionally, in one embodiment, the plurality of components may be provided as a result of determining details for each of a plurality of components to be implemented within the site, utilizing a location of the plurality of components within the site and characteristics of the site (e.g., as described in FIG. 4, etc.). In another embodiment, the plurality of components may be identified utilizing one or more hardware components (e.g., a mobile device, etc.) and/or within a cloud computing environment.

Further, method 500 may proceed with operation 504, where details of each of the plurality of components are determined. In one embodiment, the details for a component may include one or more installation instructions associated with the component (e.g., one or more quick start guides, etc.). In another embodiment, the installation instructions may be determined by cross-referencing a database of manuals with identifiers for each of the plurality of components. For example, the database may include a plurality of component identifiers, where each identifier is linked to textual data indicating installation instructions for that component. In another example, the plurality of component identifiers within the database may be matches to the identifiers for each of the plurality of components to be implemented within the site, in order to find installation instructions associated with those components.

Further still, in one embodiment, the installation instructions may be determined by scanning documentation provided with each component (e.g., utilizing a camera of a mobile device, etc.) and performing optical character recognition (OCR) on the scanned documentation. In another embodiment, the details may be determined utilizing one or more hardware components (e.g., a mobile device, etc.) and/or within a cloud computing environment.

Also, method 500 may proceed with operation 506, where the plurality of components are configured and implemented within the site, utilizing the details of each of the plurality of components. In one embodiment, configuring and implementing the plurality of components includes determining all installation actions for each of the plurality of components. For example, the installation actions may be determined utilizing the installation instructions associated with the components. In another example, installation actions may be determined for the components that emphasize one or more desired traits such as security (e.g., by utilizing an enhanced security protocol, by implementing data backups, etc.), performance (e.g., by utilizing a protocol tailored for a fast network connection without implementing backups), cost, etc. In yet another example, the desired traits may be selected by a user prior to configuring and implementing the components.

In addition, in one embodiment, configuring and implementing the plurality of components includes determining an order in which all installation actions are to be performed. For example, a plurality of general rules may be established regarding an order in which installation actions are to be performed. For instance, the order may be determined with respect to one or more identified installation prerequisites determined for each component. In another example, a component such as a router may need to be plugged in before an interface of the router is accessed. In yet another example, a first component such as a modem may need to be installed before a second component such as a router is installed.

Furthermore, in one embodiment, the plurality of general rules may be applied to all installation actions to determine the order in which the installation actions are to be performed. In another embodiment, configuring and implementing the plurality of components includes performing the installation actions, according to the determined order. For example, one or more of the installation actions may be performed automatically by an application.

For instance, a mobile device may wirelessly connect to one or more components, and an application within the mobile device may utilize one or more application programming interfaces (APIs) to communicate with each of the one or more components. The wireless connection may be implemented securely (e.g., utilizing one or more encryption and/or security protocols, etc.). In another example, the application may perform one or more installation actions directly with the components, utilizing the APIs.

In another embodiment, one or more components currently implemented within the site may be updated, based on the details of each of the plurality of components. For example, firmware, software, drivers, or other characteristics of currently implemented components may be updated or changed in order to be compatible with the components being installed and/or to optimize a performance of all components within the site.

Further still, in one embodiment, one or more of the installation actions may be presented to a user for manual performance. For example, an application of a mobile device may present manual steps (e.g., plugging a component into a power outlet, pressing a button on the component, etc.) to a user for implementation by the user. In another example, an application of a mobile device may request information (e.g., password information, device naming information, etc.) from the user, and may automatically perform additional installation actions, utilizing the requested information. Each of the manual steps may be presented according to the determined order.

Also, in one embodiment, the components may be configured and implemented utilizing one or more hardware components (e.g., a mobile device, etc.) and/or within a cloud computing environment.

In this way, components may be optimally configured and implemented within a site according to predetermined criteria such as performance, security, etc. This optimal configuration may reduce a probability of component failure and/or errors caused by incorrect component configuration and implementation, which may improve a performance of each component within the site. This optimal configuration may also optimize communications and security between components, which may reduce communications errors (e.g., dropped packets, etc.) and/or data loss, thereby improving a performance of the components.

Cognitive Home Automation Configuration

Overview

In order to implement a cognitive configuration implementation, the following components are provided:

An apparatus which has an in-depth knowledge of automation devices/IOT devices
  This knowledge includes such things as: capabilities, limitations, how to setup/install devices, how to troubleshoot devices.
A Cognitive system which has been trained with automation device/IOT device knowledge by the apparatus
  Voice to text and text to voice capabilities may be used by an apparatus to either perform automation device/IOT device setup, or to guide a person through the process of automation device/IOT device setup.
RFID tags and an RFID Reader
  A directional RFID reader may be used to determine the location of an automation device/IOT device
  Directional RFID and images may be used to determine the exact location and type of a device
  RFID tags may be preassigned for each individual room
  RFID tags may be preassigned for each individual device type to be automated
Implementation Application
  This may embody setup and controlling software
Image to Blueprint Application
  The apparatus will take a reading off of the blueprint and use its in-depth knowledge to expose risk or failure areas
Auto Measurement systems The following are exemplary steps that an end user may perform to set up their home automation system:

1. Open the application and take pictures of all the rooms in the house or building you want to automate.
2. Install stickers: 1) one set of stickers for the room, and 2) one set of stickers for the devices to be automated.
3. Take pictures of any previously installed home automation equipment.
4. When steps 1 through 3 have been completed, notify the application. The application will then cognitively process all of the required data and output a list of home automation to purchase (or will automatically purchase the required components).
5. Once the end user has the home automation equipment in hand they will then begin the process of installing the pieces and parts one at a time. The application will: 1) automatically configure a device (when API's are available) and/or 2) provide a step by step walk through of the process the end user needs to take.
6. If the end user is using voice assistance, the end user will then be asked a series of questions such as "what command would you like to use to turn on the light in your living room?" The end user's response will be programmed into the voice assistant.

The following is an exemplary high-level description of how the system setup is performed:

1. The application will cognitively process all of the provided pictures to obtain the following information:
   An overall blueprint of the structure
   The size of each of the rooms
   The composition of all walls within the structure
   Possible interference points and/or objects
2. All of the stickers the user installs will be RFID stickers. Each of the RFIDs will have an association. For example, RFID X will be a room RFID, while RFID Y will be used for a specific type of object such as a lamp.
3. The application will use the pictures of the previously purchased home automation equipment to uniquely identify the equipment. The cognitive process solution will provide a solution that is backward compatible with this equipment.
4. The application will use a cognitive process that has been trained with known home automation knowledge to produce a list of home automation equipment to purchase.
5. The application/apparatus may support all known protocols (such as Wi-Fi, ZigBee, Z-Wave, etc.). The application/Apparatus will communicate and program each of the devices with a non-proprietary interface. Devices with a proprietary interface may need to be manually set up by the end user. The application/apparatus will provide a step by step walk-through for this set up with the end user.
6. A cognitive process voice to text and text to voice implementation may be used to perform this setup. The end user will be prompted for a command, the end user will respond and then the application/apparatus will program the voice assistant.

Site Analysis

In one embodiment, an application may be initiated within a mobile device (e.g., mobile telephone, a tablet device, etc.). Room measurements may be taken for each of the rooms in the site in which one or more components are to be implemented. The measurements may be obtained via a laser distance measurement system. For example, the laser distance measurer could be built into the mobile device or physically coupled to the mobile device. In another example, the laser distance measurer could communicate with the mobile device via a wireless protocol.

In another embodiment, the mobile device may convert room images into one or more blueprints. The mobile device may have a built-in camera or it may have the capability to receive images via a physical and/or wireless connection. The site images will be converted to blueprints within the mobile device or remotely (e.g., via a cloud computing environment that receives the dimensions of the site from the mobile device).

In yet another embodiment, images may be taken of each of the rooms within the site, and the images will be fed into a local or cloud-based cognitive process (e.g., a deep neural network (DNN), etc.) that has been trained with images of various construction materials (e.g., concrete, brick, wood, etc.). The cognitive process may identify characteristics of each room within the site (e.g., a type of material used to fabricate walls within the site, etc.).

Additionally, in one embodiment, the images may be fed into the same or a different local or cloud-based cognitive process that is trained to identify objects within a room, and classify the room based on the objects. For example, the cognitive process may identify objects such as a stove, refrigerator, and sink within a room, and may label the room with a "kitchen" identifier in response to the identification of the objects within the room.

Further, in one embodiment, the determined room classification and characteristics may be added to the blueprints. For example, a final blueprint may contain dimensions for every room within a site, a classification for every room within the site, and a type of material used to construct every room within the site. These updated blueprints may be presented to one or more users for review/approval (e.g., utilizing a GUI, etc.).

Figure 6:
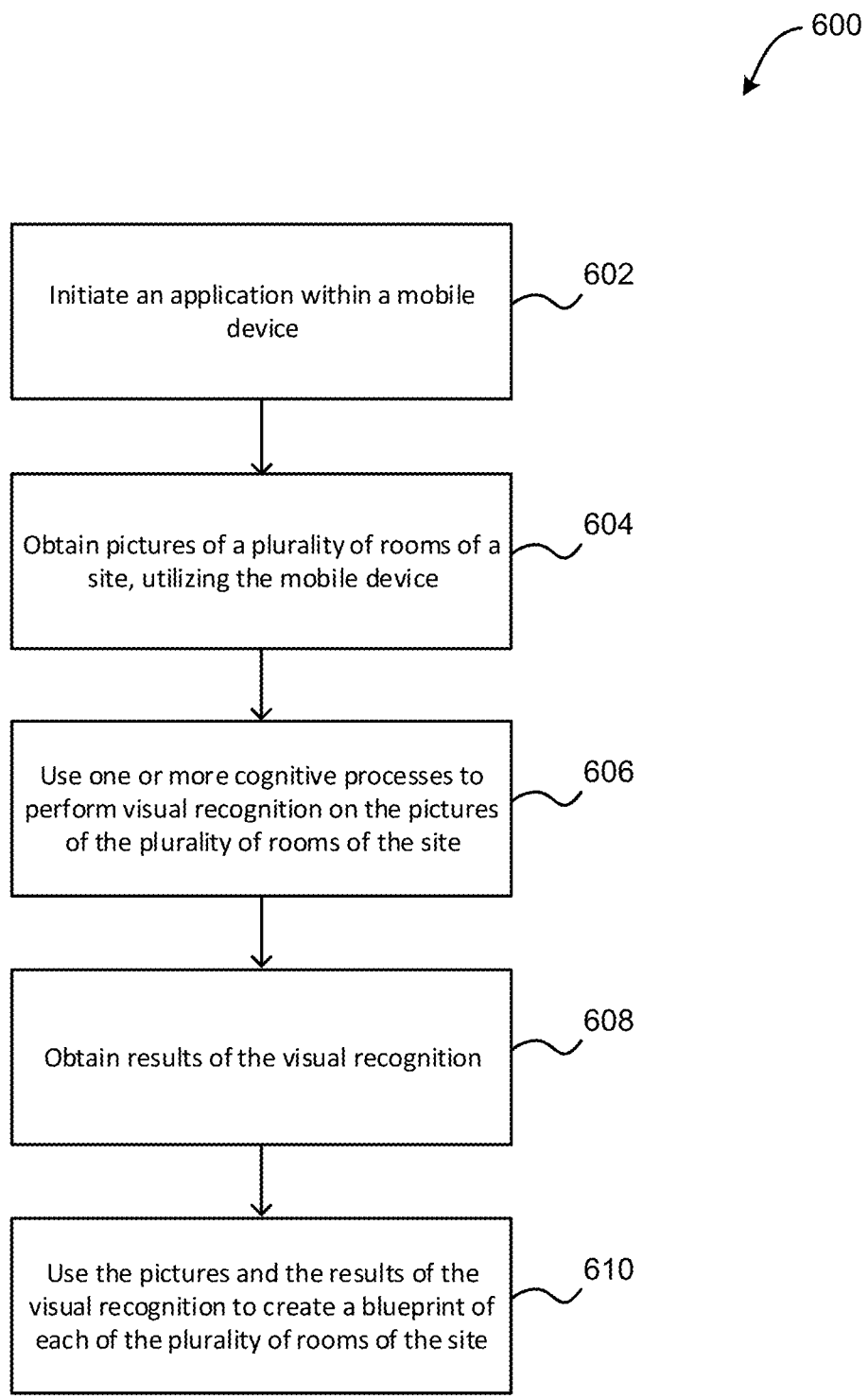
FIG. 6 illustrates a flowchart of a method for creating a site blueprint, in accordance with one embodiment.

Now referring to FIG. 6, a flowchart of a method 600 for creating a site blueprint is shown according to one embodiment. The method 600 may be performed in accordance with the present invention in any of the environments depicted in FIGS. 1-3, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where an application is initiated within a mobile device. Additionally, method 600 may proceed with operation 604, where pictures of a plurality of rooms of a site are obtained, utilizing the mobile device. Further, method 600 may proceed with operation 606, where one or more cognitive processes are used to perform visual recognition on the pictures of the plurality of rooms of the site. In one embodiment, the one or more cognitive processes may be implemented locally at the device, remotely at a cloud computing environment, etc.

Further still, method 600 may proceed with operation 608, where results of the visual recognition are obtained, where the results include a wall material type for each wall of the plurality of rooms as well as a classification of the room. Also, method 600 may proceed with operation 610, where the pictures and the results of the visual recognition are used to create a blueprint of each of the plurality of rooms of the site.

RFID Tag Analysis

In one embodiment, a set of RFID tags may be added to locations within the site where a plurality of components are desired to be implemented. For example, the RFID tags may be affixed within one or more rooms of the site, utilizing non-permanent glue or any other adhesive. In another embodiment, the RFID tags may be assigned into one or more categories. For example, there may be a plurality of different categories of RFID tags, including categories such as smart outlet, Wi-Fi LED bulb, smart TV, etc.

In another embodiment, each of the RFID tag identifiers may be pre-associated with a category. For example, a RFID tag with a predetermined ID may be categorized as a smart outlet. In yet another embodiment, the RFID tags may be removed from a pre-treated sheet that visually shows the object the RFID is associated with. For example, an RFID tag that has been categorized as a smart outlet would say smart outlet and have a picture of a smart outlet.

In yet another embodiment, an RFID reader may be used to detect a location of each of the RFID tags within the site. For example, the RFID reader may include a directional RFID reader that detects a specific location of each tag within the site with respect to a location of a calibration tag or the RFID reader itself. In another example, the RFID reader could be built into the mobile device or physically coupled to the mobile device. In another example, the RFID reader could communicate with the mobile device via a wireless protocol.

In still another example, the determined locations of each of the RFID tags within the site may be added to corresponding locations within the blueprint of each of the plurality of rooms of the site.

Pre-Existing Equipment Integration

In one embodiment, images taken by the mobile device may be analyzed for predetermined characteristics and/or equipment that are problematic to an implementation of automation. In another embodiment, the end user may be provided with an optimal automation solution that includes any preexisting equipment identified within the site, based on an analysis of the images.

For example, images may be taken of each of the rooms within the site, and the images will be fed into a local or cloud-based cognitive process (e.g., a deep neural network (DNN), etc.) that has been trained with images of home automation equipment (e.g., smart thermostats, smart LED bulbs, smart switches, etc.). The cognitive process may identify existing home automation equipment within the site.

Additionally, in one embodiment, the images may be fed into the same or a different local or cloud-based cognitive process that is trained to identify characteristics and/or equipment that are problematic to implementation of automation. The cognitive process may identify any potential implementation problems within the site (e.g., obsolete or proprietary protocols supported by existing equipment, old/slow equipment, design incompatibilities, etc.). These problems may be presented to the user, along with suggestions on how to remedy the problems (e.g., via software/firmware updates, component replacement, etc.).

Figure 7:
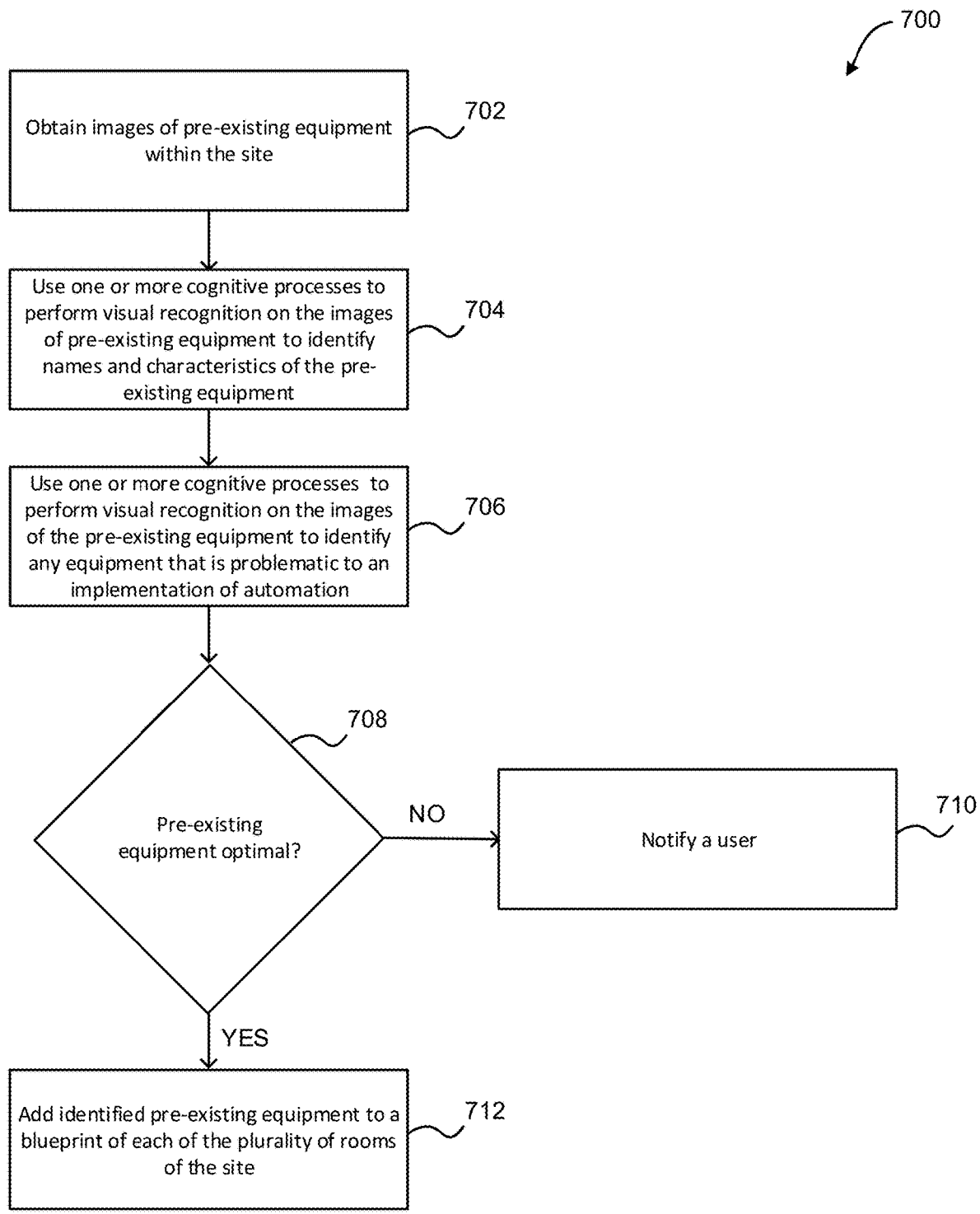
FIG. 7 illustrates a flowchart of a method for including pre-existing equipment in a site blueprint, in accordance with one embodiment.

Now referring to FIG. 7, a flowchart of a method 700 for including pre-existing equipment in a site blueprint is shown according to one embodiment. The method 700 may be performed in accordance with the present invention in any of the environments depicted in FIGS. 1-3, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where images are obtained of pre-existing equipment within the site. Additionally, method 700 may proceed with operation 704, where one or more cognitive processes are used to perform visual recognition on the images of pre-existing equipment to identify names and characteristics of the pre-existing equipment. Further, method 700 may proceed with operation 706, where one or more cognitive processes are used to perform visual recognition on the images of the pre-existing equipment to identify any equipment that is problematic to an implementation of automation.

Further still, method 700 may proceed with decision 708, where it is determined whether the identified pre-existing equipment is optimal for a desired automation implementation. If it is determined in decision 708 that the identified pre-existing equipment is not optimal for the desired automation implementation, then method 700 may proceed with operation 710, where a user is notified. If it is determined in decision 708 that the identified pre-existing equipment is optimal for the desired automation implementation, then method 700 may proceed with operation 712, where the identified pre-existing equipment is added to a blueprint of each of the plurality of rooms of the site.

Purchase List

In one embodiment, the updated blueprint may be used to provide a user with a complete list of equipment that they need to purchase. This list of equipment may include non-automation devices such as a Wi-Fi extender or a router that is Wi-Fi capable.

In another embodiment, the updated blueprint may be fed into a local or cloud-based cognitive process that analyzes all of the rooms within the site, as well as details of each room such as composition, size, distance from a required source, and objects contained in the room, in order to identify any problematic conditions. If a problematic condition is discovered, then one or more solutions are applied. The one or more solutions may be obtained by performing a textual network search of websites and social media to find matches to keywords associated with the problematic condition.

In yet another embodiment, when room processing finishes, an analysis of each individual component by the local or cloud-based cognitive process begins. This process is repeated until all of the components have been processed. The cognitive process identifies any of the following conditions that could create marginal operations or a failure to operate condition for a desired component: 1) interoperation problems with a preexisting device, 2) interference problems, and 3) environmental problems. If one of these conditions is discovered, the cognitive process searches the one or more locations for a solution. This may include, but is not limited to, searching vendor specifications to find another vendor's product that is compatible and will operate in the environment, searching vendor blogs and/or forums for known solutions, and searching various publicly available blogs and forms for known solutions.

Figure 8:
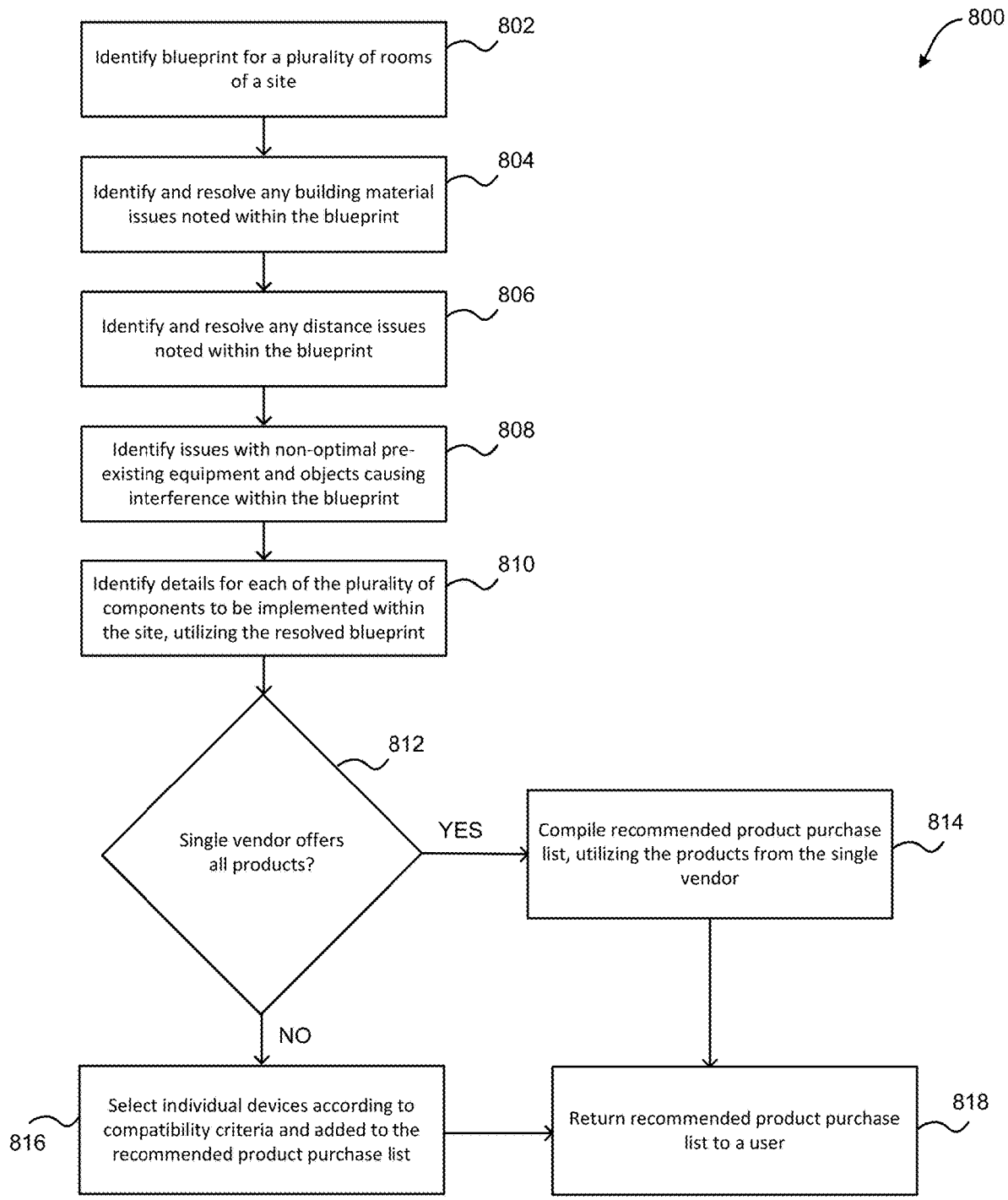
FIG. 8 illustrates a flowchart of a method for creating a list of components, in accordance with one embodiment.

Now referring to FIG. 8, a flowchart of a method 800 for creating a list of components is shown according to one embodiment. The method 800 may be performed in accordance with the present invention in any of the environments depicted in FIGS. 1-3, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where a blueprint for a plurality of rooms of a site are identified. Additionally, method 800 may proceed with operation 804, where any building material issues noted within the blueprint are identified and resolved. In one embodiment, a cognitive process may analyze all blueprint factors and search public data repositories for known solutions to any building material issues. In another embodiment, one or more components may be identified that resolve any building material issues.

Further, method 800 may proceed with operation 806, where any distance issues noted within the blueprint are identified and resolved. For example, a cognitive process may analyze all blueprint factors and search public data repositories for known solutions to any distance issues. In one embodiment, one or more components may be identified that resolve any distance issues.

For instance, the blueprints for each of the rooms in the site where one or more automation devices will be installed may be analyzed one at a time. For each of these rooms, a series of checks may be performed for known conditions that could cause marginal operation or failure to function (e.g., WiFi distance limitations, etc.). In another example, a stored limitation may indicate that 2.4 GHz communications are available 150 feet from the source, provided that there are no brick stone walls between receiving devices. This stored limitation may be compared against the blueprint to detect any possible distance/material issues.

Further still, method 800 may proceed with operation 808, where issues with non-optimal pre-existing equipment and objects causing interference within the blueprint are identified. In one embodiment, a cognitive process may analyze all blueprint factors to determine if there is an object that will/could create a marginal operation or failure to function condition. Examples of this include: 1) an automation device being located behind a 30-gallon fish tank, 2) a microwave over, or 3) an automation device located close to a wireless phone. In another embodiment, one or more components may be identified that resolve any issues with non-optimal pre-existing equipment and objects causing interference.

Also, method 800 may proceed with operation 810, where details for each of the plurality of components to be implemented within the site are identified, utilizing the resolved blueprint. In one embodiment, all components that have been identified as resolving one or more of the above issues may be identified and compiled.

Method 800 may then proceed with decision 812, where it is determined whether a single vendor offers all products matching details for each of the plurality of components to be implemented within the site. For example, optimal interoperability occurs between a single vendor's products.

Therefore, it may be determined whether a single vendor sells all of the automation products having details desired to be implemented within the site. If it is determined in decision 812 that a single vendor offers all products matching details for each of the plurality of components to be implemented within the site, then method 800 may proceed with operation 814, where a recommended product purchase list is compiled, utilizing the products from the single vendor.

However, if it is determined in decision 812 that a single vendor does not offer all products matching details for each of the plurality of components to be implemented within the site, then method 800 may proceed with operation 816, where individual devices are selected according to compatibility criteria and added to the recommended product purchase list. For example, each individual automation device may be selected one at a time. A candidate automation device may undergo a series of checks to ensure it meets the following: 1) it is compatible/interoperable with all of other previously selected automation devices, 2) It will work reliable in the location where it is to be installed (this may be determined by examining the product specification, etc.), and 3) it meets end user requirements.

Further, method 800 may proceed with operation 818, where the recommended product purchase list is returned to a user. In one embodiment, all components within the recommended product purchase list may be automatically purchased via one or more channels (e.g., online stores, etc.).

Dynamic Installation/Setup

In one embodiment, when a user has all components to be implemented within a site in hand (e.g., as per the recommended product purchase list, etc.), dynamic installation of such components may be implemented. For example, installation materials for each component may be obtained (e.g., via reliable source text, images, and/or video installation materials scanned by the user or found online), and such installation materials may be used to perform a step by step installation of all components.

In another embodiment, the end user starts an application and indicates that they have possession of all of the desired components. The application will indicate a first room (e.g., utilizing a site blueprint, etc.) where one or more components are to be installed. In yet another embodiment, the application may determine one or more installation prerequisites for one or more components, and any component having a prerequisite will not be installed until such time as the prerequisite has been met. For example, device A uses Wi-Fi and no Wi-Fi is available, so the application will direct the end user to install and set up Wi-Fi before installing device A.

Figure 9:
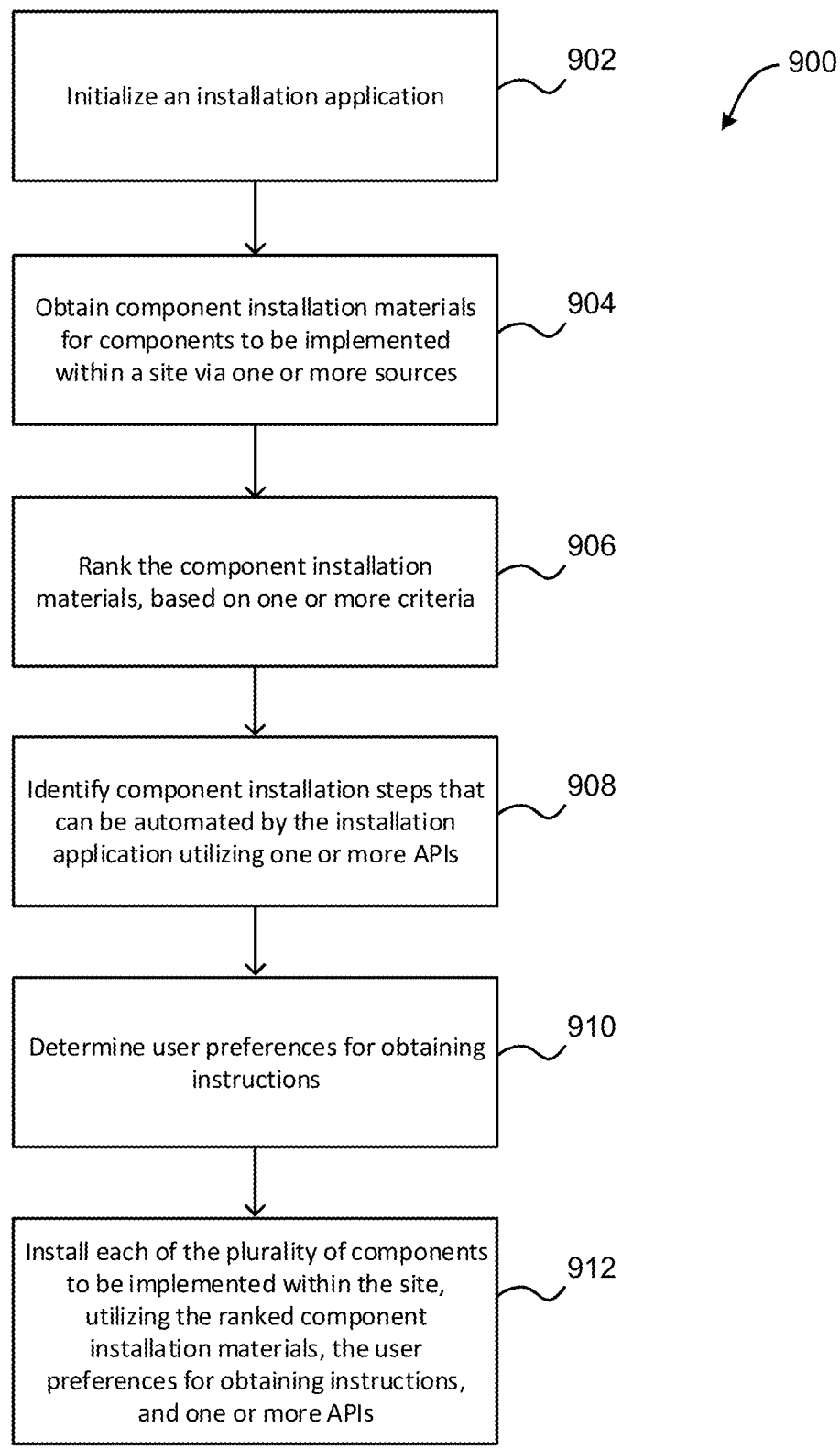
FIG. 9 illustrates a flowchart of a method for installing components within a site, in accordance with one embodiment.

Now referring to FIG. 9, a flowchart of a method 900 for installing components within a site is shown according to one embodiment. The method 900 may be performed in accordance with the present invention in any of the environments depicted in FIGS. 1-3, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where an installation application is initialized. For example, the installation application may be initialized on a mobile device. Additionally, method 900 may proceed with operation 904, where component installation materials for components to be implemented within a site are obtained via one or more sources. In one embodiment, the component installation materials may include one or more of installation manuals, example installation pictures, component installation videos, etc.

For example, text information may be searched and gathered using one or more semantic and/or textual analytics techniques. A cognitive search process may be used to obtain video and images.

Further, method 900 may proceed with operation 906, where the component installation materials are ranked, based on one or more criteria. For example, for each of the component installation materials, an initial ranking may be assigned based upon at least the following factors:

vendor information receives a higher ranking than non-vendor information information from recognized industry experts receives a higher ranking than information from non-recognized individuals any information that has a rating associated with it receives that initial ranking (this ranking may be normalized based on a rating scale being used)

any information that either has no ranking or cannot be verified will be initially ranked with a neutral rating (between a high ranking and a low ranking)

Further still, method 900 may proceed with operation 908, where component installation steps are identified that can be automated by the installation application utilizing one or more APIs. In this way, the application will know which devices the application can automatically setup using an API, the devices it has video installation instructions for, and the devices it has reliable written installation instructions for.

Also, method 900 may proceed with operation 910, where the installation application determines user preferences for obtaining instructions. For example, the application may communicate with the end user and ask them their preference for obtaining instructions (e.g., text, video, audio walk through, etc.). If the end user chooses an audio walk through option, then the application may use a cognitive text to voice process to output instructions.

In addition, method 900 may proceed with operation 912, where each of the plurality of components to be implemented within the site are installed, utilizing the ranked component installation materials, the user preferences for obtaining instructions, and one or more APIs. In one embodiment, if an end user indicates that a text document be read to them it will be necessary to use a cognitive process such as a text to speech process. This process uses speech-synthesis capabilities to synthesize text into natural-sounding speech.

Further, installation of each component may be implemented via one or more of the following steps:

the installation application automatically performs the installation the installation application provides a text walk through of the install/setup process the installation application gives either an audio or video walk through of the install/setup process In another embodiment, prerequisites to installation of a component may be identified and implemented prior to the installation of the component. Each prerequisite may be installed one at a time until all prerequisites have been installed for a given device. Once all of the prerequisites have been installed then the installation/setup of the actual device begins. This process is repeated until all of the devices have been installed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying, utilizing image analysis of a picture of a site, locations of a plurality of components to be implemented within the site;
   identifying, utilizing the image analysis of the picture of the site, characteristics of the site, including one or more devices currently implemented within the site and physical dimensions of the site; and
   determining details for each of the plurality of components to be implemented within the site, utilizing the locations of the plurality of components and the characteristics of the site.

2. The computer-implemented method of claim 1, further comprising configuring and implementing the plurality of components within the site, utilizing the details of each of the plurality of components.

3. The computer-implemented method of claim 1, wherein the plurality of components include a plurality of home automation devices desired to be implemented within the site.

4. The computer-implemented method of claim 1, wherein the locations of the plurality of components are identified utilizing a plurality of radio frequency identification (RFID) tags.

5. The computer-implemented method of claim 1, wherein the locations of the plurality of components are identified utilizing image analysis of a plurality of visual tags within the picture of the site.

6. The computer-implemented method of claim 1, wherein identifying the locations of the plurality of components to be implemented within the site includes analyzing one or more visual tags placed within the site, where each of the one or more visual tags includes a matrix barcode that is analyzed to determine the one of the plurality of components associated with the visual tag.

7. The computer-implemented method of claim 1, wherein identifying physical dimensions of the site utilizing the image analysis of the picture of the site includes approximating the physical dimensions of the site utilizing one or more landmarks.

8. The computer-implemented method of claim 1, comprising:
   determining a make and model of each of the one or more devices currently implemented within the site, utilizing image comparison and textual analysis of writing on each of the one or more devices; and
   cross-referencing each of the one or more devices currently implemented within the site with one or more databases to determine functionality and features of each of the one or more devices.

9. The computer-implemented method of claim 1, wherein the image analysis is utilized to determine whether a wall within the site is a signal blocking cinder block wall.

10. The computer-implemented method of claim 1, wherein the details for each of the plurality of components to be implemented within the site include:
    a required wireless communications protocol, a required security protocol, a required communications range, and a required amount of data storage, and
    a placement of each of the plurality of components within the site.

11. The computer-implemented method of claim 1, wherein the locations of the plurality of components to be implemented within the site, as well as the characteristics of the site, are identified within a cloud computing environment.

12. The computer-implemented method of claim 1, wherein the details for each of the plurality of components to be implemented within the site include required characteristics of each of the plurality of components.

13. The computer-implemented method of claim 1, wherein the details for each of the plurality of components to be implemented within the site include one or more interference factors that are determined for the site, utilizing the characteristics of the site.

14. The computer-implemented method of claim 1, wherein the details for each of the plurality of components to be implemented within the site include a placement of each of the plurality of components within the site.

15. The computer-implemented method of claim 1, wherein additional components to be implemented within the site are determined, based on the locations of the plurality of components and the characteristics of the site.

16. The computer-implemented method of claim 1, wherein a virtual blueprint is constructed for the site, based on the details for each of the plurality of components to be implemented within the site and the characteristics of the site.

17. The computer-implemented method of claim 1, wherein the details for each of the plurality of components to be implemented within the site are compared to a list of currently available components in order to determine a build list.

18. The computer-implemented method of claim 1, further comprising determining a new location for a first device currently implemented within the site in response to determining that the first device creates one or more interference factors.

19. A computer program product for performing cognitive component selection, the computer program product comprising a non-transitory computer readable storage medium having program instructions embodied therewith, the program instructions executable by a processor to cause the processor to perform a method comprising:
- identifying, by the processor utilizing image analysis of a picture of a site, locations of a plurality of components to be implemented within the site;
- identifying, by the processor utilizing the image analysis of the picture of the site, characteristics of the site, including one or more devices currently implemented within the site and physical dimensions of the site; and
- determining, by the processor, details for each of the plurality of components to be implemented within the site, utilizing the locations of the plurality of components and the characteristics of the site.

20. A computer-implemented method, comprising:
- identifying, utilizing image analysis of a picture of a site, a plurality of components to be implemented within the site and physical dimensions of the site;
- determining, utilizing the image analysis of the picture of the site, details of each of the plurality of components; and
- configuring and implementing the plurality of components within the site, utilizing the details of each of the plurality of components.

* * * * *